United States Patent
Lanier et al.

(10) Patent No.: US 6,863,005 B2
(45) Date of Patent: Mar. 8, 2005

(54) PROCESS TO REDUCE MERCURY EMISSION

(75) Inventors: William Steven Lanier, Durham, NC (US); Charles M. Booth, Raleigh, NC (US); Vitali V. Lissianski, San Juan Capistrano, CA (US); Vladimir M. Zamansky, Oceanside, CA (US); Peter M. Maly, Lake Forest, CA (US); William Randall Seeker, San Clemente, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/724,251

(22) Filed: Dec. 1, 2003

(65) Prior Publication Data

US 2004/0134396 A1 Jul. 15, 2004

Related U.S. Application Data

(62) Division of application No. 10/054,850, filed on Jan. 25, 2002, now Pat. No. 6,726,888.

(51) Int. Cl.$^7$ .............................................. F23J 15/00
(52) U.S. Cl. ..................................... 110/345; 423/210
(58) Field of Search ................................ 110/342, 344, 110/345; 423/210

(56) References Cited

U.S. PATENT DOCUMENTS

| | | | |
|---|---|---|---|
| 4,977,837 A | 12/1990 | Roos et al. | |
| 5,002,741 A | 3/1991 | Hooper | |
| 5,484,476 A | 1/1996 | Boyd | |
| 5,512,257 A | 4/1996 | Frey | |
| 5,546,874 A | 8/1996 | Breen et al. | |
| 5,555,821 A | 9/1996 | Martinez | |
| 5,672,323 A | * 9/1997 | Bhat et al. | 422/172 |
| 5,706,645 A | 1/1998 | Mollot et al. | |
| 5,787,823 A | * 8/1998 | Knowles | 110/344 |
| 5,849,075 A | 12/1998 | Hopkins et al. | |
| 5,868,084 A | * 2/1999 | Bachik | 110/257 |
| 5,887,724 A | 3/1999 | Weyand et al. | |
| 5,990,374 A | 11/1999 | Vicard et al. | |
| 6,024,301 A | 2/2000 | Hurley et al. | |
| 6,027,551 A | 2/2000 | Hwang et al. | |
| 6,145,449 A | 11/2000 | Kaneko et al. | |
| 6,155,965 A | 12/2000 | Santen et al. | |
| 6,202,573 B1 | 3/2001 | Bachik | |
| 6,280,695 B1 | * 8/2001 | Lissianski et al. | 423/239.1 |
| 6,439,138 B1 | * 8/2002 | Teller et al. | 110/345 |
| 6,521,021 B1 | * 2/2003 | Pennline et al. | 95/134 |

* cited by examiner

Primary Examiner—Kenneth Rinehart
(74) Attorney, Agent, or Firm—Ernest G. Cusick; Philip D. Freedman

(57) ABSTRACT

In a method to decrease emission of mercury, a factor is selected to control a combustion process to generate a flue gas comprising fly ash with enhanced unburned carbon; the combustion process is controlled according to a factor selected from reburning fuel, flue gas temperature, OFA injection, coal particle size, LNB flow, LNB design, combustion zone air, stoichiometric ratio of fuel, fuel/air mixing in a primary combustion zone and fuel/air mixing in a secondary combustion zone to produce the flue gas comprising fly ash with enhanced unburned carbon and to vaporize mercury; and the flue gas is allowed to cool to collect fly ash with enhanced unburned carbon with absorbed mercury. A system to decrease emission of mercury; comprises a combustion zone that is controlled to generate a flue gas comprising fly ash with enhanced unburned carbon and that produces vaporized mercury; and a post combustion zone to cool the flue gas to collect fly ash with enhanced unburned carbon with absorbed mercury.

32 Claims, 2 Drawing Sheets

PROCESS TO REDUCE MERCURY EMISSION

This application is a division of application Ser. No. 10/054,850, filed Jan. 25, 2002 now U.S. Pat. No. 6,726,888.

BACKGROUND OF THE INVENTION

The invention relates to a process and system to reduce emissions of nitrogen oxides and mercury and to reduce the level of carbon in combustion fly ash. More specifically, the present invention provides a process and system to increase use of fly ash and to decrease nitrogen oxides and mercury from flue gases from combustion systems such as boilers, furnaces and incinerators.

Production of air pollution by combustion systems is a major problem of modern industrial society. The pollution can include particulates such as fine fly ash particles from solid fuel combustion (for example, pulverized coal firing), and gas-phase species, such as oxides of sulfur ($SO_x$, principally $SO_2$ and $SO_3$), carbon monoxide, volatile hydrocarbons, nitrogen oxides (mainly NO and $NO_2$ collectively referred to "$NO_x$") and volatile metals such as mercury (Hg).

The nitrogen oxides are the subject of growing concern because of their toxicity and their role as precursors in acid rain and photochemical smog processes. $NO_x$ is emitted by a variety of sources, including mobile sources (such as automobiles, trucks and other mobile systems powered by internal combustion engines), stationary internal combustion engines and other combustion sources such as power plant boilers, industrial process furnaces and waste incinerators. Available $NO_x$ control technologies include Selective Catalytic Reduction (SCR) and Combustion Modification. SCR systems can be designed for most boilers and may be the only approach for high $NO_x$ units such as cyclones. Combustion Modification achieves deep $NO_x$ control by integrating several components. Typically, Low $NO_x$ Burn (LNB) is the lowest cost Combustion Modification technique. It is usually applied as a step towards low cost deep $NO_x$ control. Other Combustion Modification techniques include Overfire Air (OFA), Reburning and Advanced Reburning.

Mercury is identified as a hazardous air pollutant and is the most toxic volatile metal in the atmosphere. Elemental mercury vapor can be widely dispersed from emission sources. Other forms of mercury pollutants include organic and inorganic compounds that accumulate in plants and animals. Mercury is a constituent part of coal mineral matter. Its emission from coal-fired power plants is suspected to be a major source of environmental mercury.

Thus, there is a need to continue to use low $NO_x$ technologies but to effectively control mercury emission.

BRIEF DESCRIPTION OF THE INVENTION

The invention provides an integrated method and system for reducing $NO_x$ environment emissions and mercury environment emissions. In the method, a factor is selected to control a combustion process to generate a flue gas comprising fly ash with enhanced unburned carbon; the combustion process is controlled according to a factor selected from reburning fuel, flue gas temperature, OFA injection, coal particle size, LNB flow, LNB design, combustion zone air, stoichiometric ratio of fuel, fuel/air mixing in a primary combustion zone and fuel/air mixing in a secondary combustion zone to produce the flue gas comprising fly ash with enhanced unburned carbon and to vaporize mercury; and the flue gas is allowed to cool to collect fly ash with enhanced unburned carbon with absorbed mercury.

In an embodiment, the method decreases emissions of nitrogen oxide and mercury while decreasing carbon in fly ash. The method comprises selecting a combination of factors from the group consisting of fuel type, fuel/air staging and a combustion condition to control a combustion process to generate a flue gas comprising fly ash with enhanced unburned carbon; controlling the combustion process according to the factors to produce the flue gas comprising fly ash with enhanced unburned carbon, $NO_x$ and vaporized mercury; removing $NO_x$ from the flue gas; allowing the flue gas to cool to a lower temperature to collect fly ash with absorbed mercury; passing the fly ash with absorbed mercury through an ash burnout unit to remove carbon from the fly ash and to produce a mercury-containing exhaust gas; and passing the mercury-containing exhaust gas through a collection unit to capture the mercury.

Additionally, the invention relates to a system to decrease emission of mercury; comprising a combustion zone that is controlled to generate a flue gas comprising fly ash with enhanced unburned carbon and that produces vaporized mercury; and a post combustion zone to cool the flue gas to collect fly ash with enhanced unburned carbon with absorbed mercury.

In another embodiment, the invention is a system to decrease emissions of nitrogen oxide and mercury while decreasing carbon in fly ash, comprising a combustion zone that is controlled by fuel type, fuel/air staging or a combustion condition to generate a flue gas comprising fly ash with enhanced unburned carbon and that produces vaporized mercury; a post combustion zone to cool the flue gas to collect fly ash with enhanced unburned carbon with absorbed mercury; an ash treatment unit that removes carbon from the fly ash and produces a mercury-containing exhaust gas; and a collection unit that captures the mercury.

DETAILED DESCRIPTION OF THE INVENTION

Commercially available $NO_x$ control technologies for stationary combustion sources are known to increase carbon content in fly ash (carbon in ash can be referred to as Loss on Ignition (LOI)). This is because $NO_x$ control principles in Combustion Modification are based on fuel and/or air staging. Staging combustion configurations that require both fuel-rich and fuel-lean zones to control $NO_x$ emissions do not provide sufficient upper furnace residence time for complete carbon burnout. The increase in ash carbon content decreases combustion efficiency. Carbon content increase can make the ash unsuitable for use in cement. As a result, the ash must be discarded to landfill at an additional cost.

The invention represents an improvement over prior techniques in that $NO_x$ and mercury are effectively and efficiently reduced. In an embodiment, this is accomplished without creating a waste stream of ash. In an embodiment, the invention surprisingly achieves improvement by synergistically combining the effects of $NO_x$ reduction in fuel-rich zones, $NO_x$ reduction on the surface of an enhanced active carbon in fly ash, mercury absorption on carbon in ash and by the utilization of ash burnout and mercury recovery systems. The invention allows for the formation of enhanced active fly ash under controlled conditions of coal reburning or other fuel or air staging low $NO_x$ technologies. The invention is particularly applicable to stationary combustion systems.

These and other features will become apparent from the drawings and following detailed discussion, which by way of example without limitation describe preferred embodiments of the invention.

Figure 1:
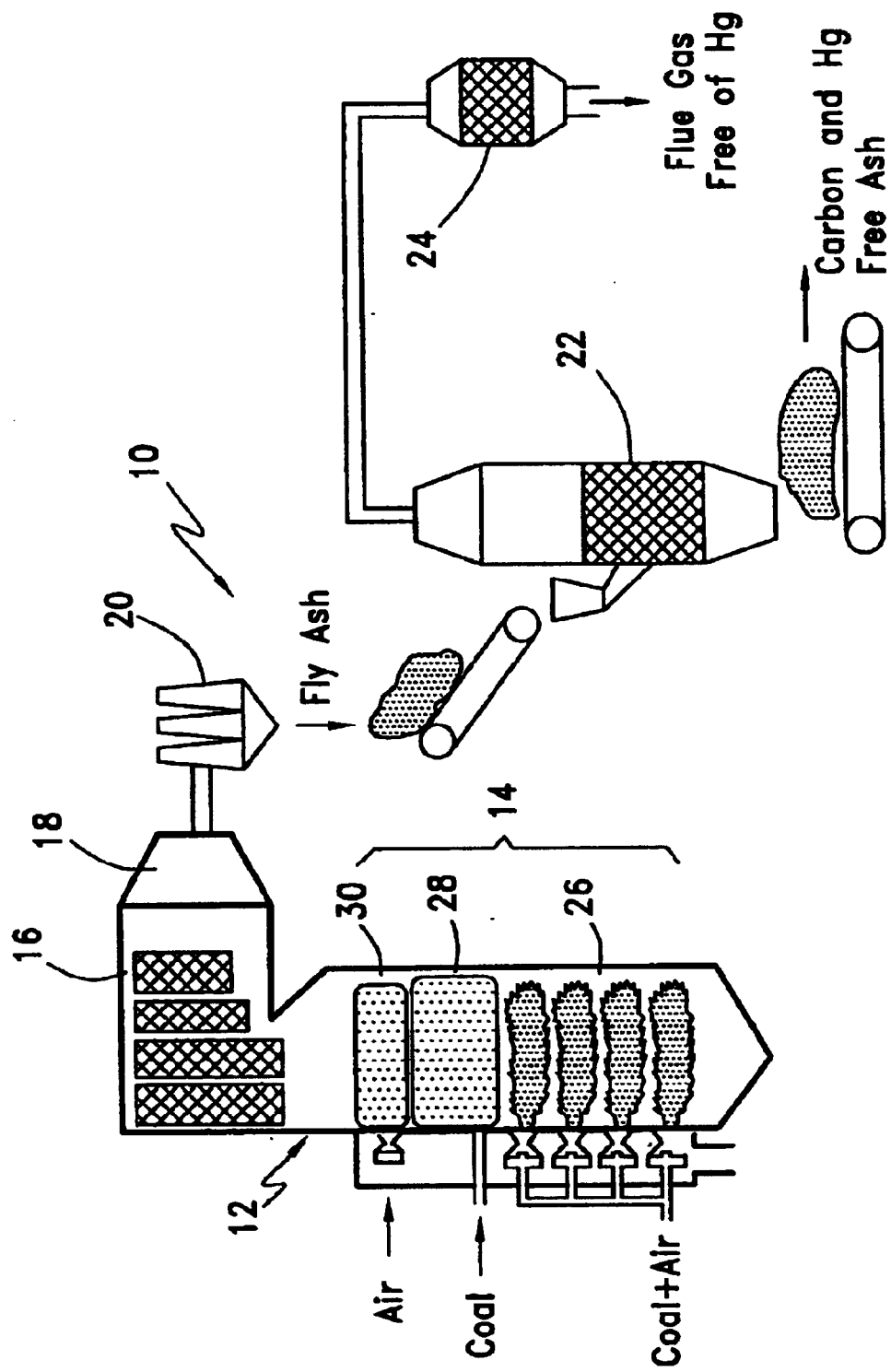
FIG. 1 is a schematic representation of a coal-fired combustion device adapted for a method of the invention.

FIG. 1 shows system 10 of the invention. As shown in FIG. 1, the system 10 comprises a coal-fired boiler 12. The boiler 12 includes a combustion zone 14 and post combustion zone 16, which includes convective pass 18. System 10 further includes particulate control device (PCD) 20, ash burnout unit 22 and mercury collection unit 24 comprising a bed of activated carbon or other reagent. Most of the coal is burned in a primary combustion zone 26 of the boiler 12. The remaining coal is injected downstream to provide a fuel-rich reburning zone 28. Overfire air is injected into a burnout zone 30 to complete combustion.

Combustion in the primary zone 26 generates $NO_x$. Most mercury content of the coal is transferred to gas phase during combustion. In reburning zone 28, $NO_x$ from primary combustion zone 26 is reduced to $N_2$. During the reburning process, carbon in the reburning coal does not burn out as completely as in a boiler environment that has excess air. Therefore, coal reburning increases the level of unburned carbon in the flue gas. By selecting coal type and specific conditions for injection of fuel and air, the combustion process can be controlled to produce a flue gas with increased carbon-containing fly ash. The flue gas is cooled at convective pass 18 where mercury is absorbed by the fly ash carbon. The fly ash with mercury is then collected in the PCD 20. Fly ash collected in the PCD 20 is treated in an ash treatment unit 22. Ash treatment unit can be an electrostatic separator, a burnout unit or the like. If a burnout unit is used, then excess heat can be partially recovered, for example by the plant by preheating water used for boiler heat exchange. Mercury released from the fly ash carbon is absorbed by activated carbon as the ash burnout products pass through mercury collection unit 24.

In the FIG. 1 embodiment, concentrations of nitrogen oxides, mercury, and carbon in ash are reduced by a three-step process. In the first step, the concentration of $NO_x$ is decreased in the fuel-rich zone of coal reburning (in other embodiments this step can be accomplished by LNB or by another fuel/air staging low $NO_x$ Combustion Modification technology). The combustion zone of the particular technology is controlled to form enhanced carbon in fly ash. The enhanced carbon in fly ash can be formed by optimizing the fuel staging and air staging conditions and combustion conditions, for example, by changing the amount of the reburning fuel, temperature of flue gas at the location of reburning fuel and/or OFA injection. Also, more active carbon in fly ash can be formed by selecting a coal type or particle size. Also, enhanced carbon can be controlled by adjusting LNB flow, by selecting a specific LNB design, by regulating excess air in the main combustion zone, adjusting the stoichiometric ratio of fuel and adjusting fuel/air mixing in primary and secondary combustion zones. Other approaches to form and enhance the formation of active carbon in fly ash can be used. The enhanced carbon in fly ash is formed "in-situ," i.e. in the burner, in the main combustion zone or in the reburning zone. The fly ash can have a concentration of carbon of about 1 to about 30 weight percent, desirably 3 to 20 weight percent and preferably 5 to about 15 weight percent.

In the second step, the carbon-containing fly ash is cooled to below 450° F., desirably below 400° F. and preferably below 350° F. At these levels, $NO_x$ is further reduced in a reaction with carbon, and mercury is absorbed by the enhanced carbon in the fly ash. A PCD can collect the ash with carbon and absorbed mercury.

In the third step, the carbon is burned out from the fly ash. At the same time, mercury is desorbed from fly ash and collected in an activated carbon bed or a bed of other reagents, for example, gold or other metals that form amalgams. Currently, carbon burnout reactors are designed for effective removal of carbon. In the invention, the burnout reactor can be used in combination with a mercury capture reactor.

It is beneficial to use in-situ formed carbon in fly ash for mercury removal instead of activated carbon injection for a number of reasons. Activated carbon is produced by pyrolysis of coal, wood and other materials at relatively low temperatures and in a time consuming process that can take from many hours to several days. In the invention, enhanced carbon in fly ash can be produced in a matter of seconds at combustion temperatures. Since the stream of gas through the carbon burnout reactor is much smaller than the stream of flue gas, the amount of activated carbon needed to collect mercury can be about two orders of magnitude lower than the amount of injected activated carbon to accomplish the same result. Additionally, the cost of controlling conditions to optimize production of enhanced carbon in fly ash from a coal-fired boiler typically, on a mass basis, is much less than the cost of injected activated carbon. Further in the invention, since the carbon is produced "in situ," no extra costs are incurred in respect of handling of the activated carbon and delivering it to the boiler. Thus mercury control in accordance with the invention, represents only a small incremental cost above and beyond the cost of $NO_x$ control.

The following EXAMPLES are illustrative and should not be construed as limitations on the scope of the claims unless a limitation is specifically recited.

EXAMPLE 1

Tests were performed in a Boiler Simulator Furnace (BSF). The BSF was a down-fired combustion research facility that had a nominal firing capacity of $1 \times 10^6$ Btu/hr. The BSF was designed to simulate chemical and thermal characteristics of a utility boiler. The BSF was equipped to fire natural gas, oil or coal. The BSF had two main sections: a vertical down-fired radiant furnace and a horizontal convective pass. The furnace was constructed of eight modular refractory lined sections with access ports. It was cylindrical in shape and had an inside diameter of 22 in. The convective pass contained air-cooled tube bundles to simulate boiler heat transfer banks. The BSF was equipped with both a baghouse and an electrostatic precipitator for particulate control at the end of the convective pass.

The BSF is well-suited to process development studies leading to utility boiler applications because it accurately simulates boiler thermal environments. Flame characteristics, gas-phase sampling, gas temperature, continuous monitoring of combustion products and pollutants, particulate mass loading, particle size and resistivity and particle deposition rates onto heat transfer surfaces are typical types of studies that can be made in the BSF.

A continuous emissions monitoring system (CEMS) was used for on-line flue gas analysis. The CEMS components included a water-cooled sample probe, sample conditioning system (to remove water and particulate) and gas analyzers. The CEMS was capable of determining $O_2$: paramagnetism to 0.1% precision, $NO_x$: chemiluminescence to 1 ppm precision, CO: nondispersive infrared spectroscopy to 1 ppm precision, $CO_2$: nondispersive infrared spectroscopy to 0.1% precision, $SO_2$: nondispersive ultraviolet spectroscopy to 1 ppm precision and Total Hydrocarbons (THC): Flame ionization detection to 1 ppm precision.

High purity dry nitrogen was used to zero each analyzer before and after each test. EPA protocol span gases were used to calibrate and check linearity of the analyzers. Test data was recorded on both a chart recorder and a personal computer based data acquisition system employing Labview® software. A suction pyrometer was used to measure furnace gas temperatures. A high volume filter was used to obtain ash samples. The samples were sent to a contract laboratory for residual carbon analysis.

Carbon in fly ash was formed using two approaches: by limiting the amount of air in the combustion zone and by fuel staging (reburning). An on-line mercury analyzer from PS Analytical was used in these tests to monitor mercury emissions. The analyzer measured both elemental (Hg) and oxidized ($Hg^{+2}$) mercury in flue gas. In the reburning tests, coal was fired through a main burner under normal excess air conditions. A second coal stream (reburning fuel—see FIG. 1) was injected into the furnace to produce a fuel rich-zone in which $NO_x$ emissions were reduced to $N_2$. Overfire air was then added to burn out any remaining combustibles. Fly ash generated by this process contained an increased amount of carbon that effectively captured mercury emissions.

Mercury measurements were conducted in a slip-stream using a fabric filter to collect fly ash. This set up was used to simulate a baghouse. Temperature of flue gas at the location where slip-stream was separated from the main stream was about 500° F. The fabric filter surface area was 0.56 ft². Flue gas flow passing through the fabric filter varied between 1.9 scfm and 2.3 scfm. Temperature of the filter varied from 300° F. to 370° F.

Mercury concentration was measured behind fabric filter to avoid interference of fly ash with the mercury analyzer. Mercury measurements were done first for baseline coal firing (SR=1.16), which resulted in a carbon in ash content of less than 2%. BSF conditions were then changed to form high carbon fly ash. In the reburning tests, carbon in ash content varied from 8% to 14% by changing heat input of the reburning fuel and temperature of the reburning fuel injection between 2000° F. and 2500° F. It is believed that carbon in ash increased with decrease in injection temperature because of lower residence time. The lower residence time results in incomplete combustion of the reburning coal. In tests where high carbon fly ash was formed by reducing excess air, stoichiometric ratio (SR) in the combustion zone varied from 1.03 to 1.16 resulting in carbon in ash content between 1% and 7%.

A series of tests was conducted to demonstrate the invention under a variety of process conditions. Kittanning coal from Pennsylvania was used as the main fuel in all tests. Three coals were included in the tests—Kittanning, a North Antelope coal from the Powder River Basin and a Ukrainian coal. These coals were selected to provide a range of analytical properties, including fixed carbon, volatile matter and ash characteristics. The tests were performed to generate various levels of $NO_x$ control and fly ash carbon amount and activity. In the tests, the following parameters were varied: (1) coal type: Kittanning, North Antelope, and Ukrainian; (2) reburn coal grind: 55–90% passing through a U.S. size 200 mesh sieve; (3) reburn heat input: between 20% and 30% of the total; and (4) residence time in the reburning zone: between 0.75 and 1.0 s.

An analysis was performed for each coal, including ash and mercury contents. Fly ash samples were collected from fabric filter and analyzed. Mercury was analyzed by double gold amalgamation/cold vapor atomic absorption. Carbon in fly ash was also analyzed. This allowed mercury capture to be defined as a function of fly ash carbon.

Figure 2:
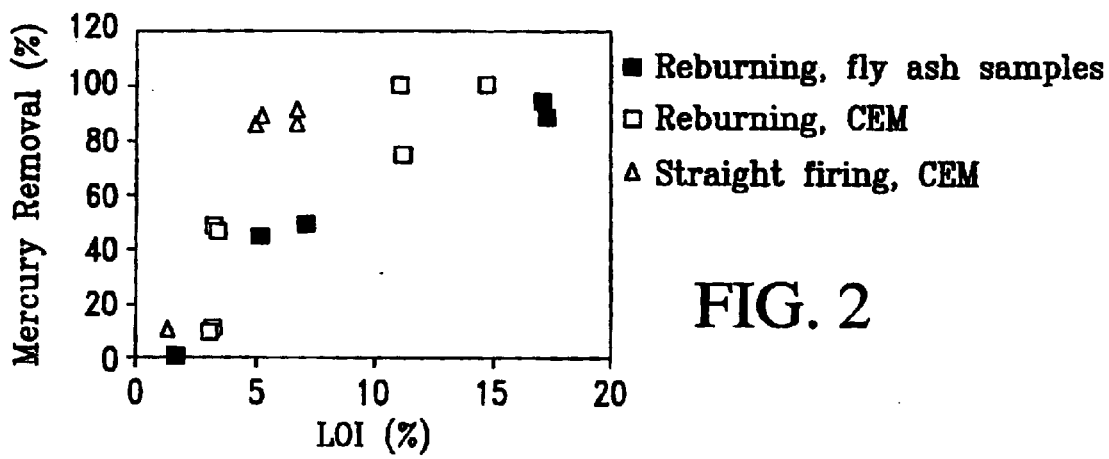
FIG. 2 is a graph showing effects of in-situ formed carbon in ash on $NO_x$ and Hg removal.

FIG. 2 presents reburning and straight firing data obtained with Kittanning coal. FIG. 2 shows good agreement between two approaches (on-line mercury emissions measurements and measurements of mercury captured by fly ash) to determine mercury removal. FIG. 2 also demonstrates that carbon in ash content is one of the important parameters that affect activity of fly ash. Mercury removal increases almost linearly with carbon in ash increase for LOI less than 7% and then levels off. The data demonstrate that in situ formed carbon in ash in contents of 5 to 12 weight percent can effectively reduce mercury emission.

TABLE 1 shows the effect of carbon in ash content on $NO_x$ reduction and mercury capture by fly ash formed in coal reburning obtained with Kittanning and Ukrainian coal. Although the amounts of carbon in fly ash are close for these coals, Kittanning coal produces much more active carbon in fly ash providing more efficient mercury control and $NO_x$ control.

TABLE 1

| Reburn Fuel Type | Ash LOI % dry | Inlet Hg mg/hr | Hg in Fly Ash mg/hr | Hg Capture by Fly Ash % of inlet | $NO_x$ Reduction % |
|---|---|---|---|---|---|
| None | 1.66 | 2.53 | 0.085 | 3.4 | |
| Ukrainian | 2.38 | 3.07 | 0.314 | 10.2 | 50.8 |
| Kittanning | 3.15 | 3.16 | 1.38 | 43.7 | 55.3 |

EXAMPLE 2

A process model was developed and used to predict $NO_x$ and mercury control in coal reburning. The process model included a detailed kinetic mechanism of coal reburning combined with gas dynamic parameters characterizing mixing of reagents and global reactions of carbon burnout and mercury absorption. In the modeling, a set of homogeneous and heterogeneous reactions representing the interaction of reactive species was assembled. Each reaction was assigned a certain rate constant and heat release or heat loss parameter. Numerical solution of differential equations for time-dependent concentrations of the reagents permitted prediction of concentration-time curves for all reacting species under selected process conditions. Modeling revealed the process conditions required for improvements in $NO_x$ and mercury removal.

The chemical kinetic code ODF, for "One Dimensional Flame" was employed to model BSF experimental data. ODF is designed to march through a series of well-stirred or plug flow reactors, solving a detailed chemical mechanism. The kinetic mechanism consisted of over 500 reactions, including both gas-phase and heterogeneous reactions. The gas phase reactions described chemical behavior of 94 C—H—O—N species. The heterogeneous reactions included devolatilization of the coal, soot and char; char oxidation by $O_2$; soot oxidation by $O_2$ and oxygen-containing radicals; reduction of NO on the char and soot surfaces; and radical recombination on the char and soot surfaces. The mechanism was supplemented with reactions describing interactions of gas-phase mercury-containing species with other gas-phase components and char.

The reaction between mercury and char was introduced using an effective reaction describing mercury absorption and desorption on the carbon surface:

$$Hg(g) + C(s) \leftrightarrows Hg-C(s) \qquad (1)$$

where Hg—C(s) indicates carbon with bound mercury on its surface. Rate coefficient of this reaction was calibrated against pilot-scale data (Brown, T. D., Smith, D. N., Hargis, R. A., Jr., and O'Dowd, W. J. "Mercury Measurement and Its Control: What We Know, Have Learned, and Need to Further Investigate," J. Air & Waste Manage. Assoc., 1999, pp. 1–97) on mercury removal by fly ash collected in a particulate control device and re-injected into flue gas. The activation energy of this reaction was adjusted to describe the temperature dependence of the mercury absorption/desorption rate, while the pre-exponential factor was fitted to describe the absolute values of the absorption/desorption rates on fly ash with different carbon content. The model was used to describe experimental data on $NO_x$ reduction and mercury removal in Kittanning coal reburning obtained in the BSF. The reburning fuel was injected into flue gas at 2500° F. The initial amount of $NO_x$ was 600 ppm. The temperature of flue gas decreased in the model at a linear rate of −550° F./s, approximately as in the experiments.

Figure 3:
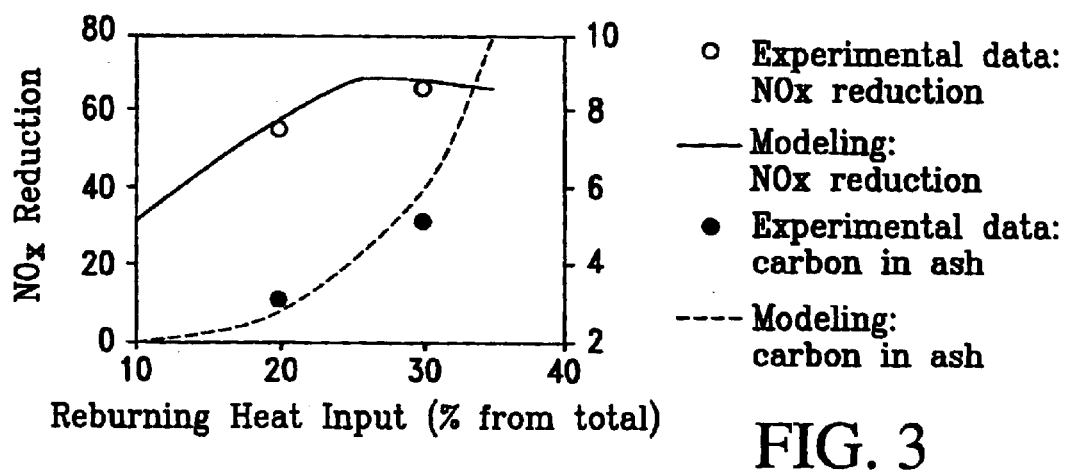
FIGS. 3 and 4 show modeling prediction comparisons.

A comparison of BSF experimental data on Kittanning coal and modeling predictions on $NO_x$ reduction and the amount of carbon in ash is presented in FIG. 3. Modeling predicts that an increase in the amount of the reburning fuel from 20% to 25–30% can result in additional ~10% $NO_x$ reduction. An increase in the amount of the reburning fuel also results in a carbon in ash increase, which can be used to reduce mercury emissions.

Figure 4:
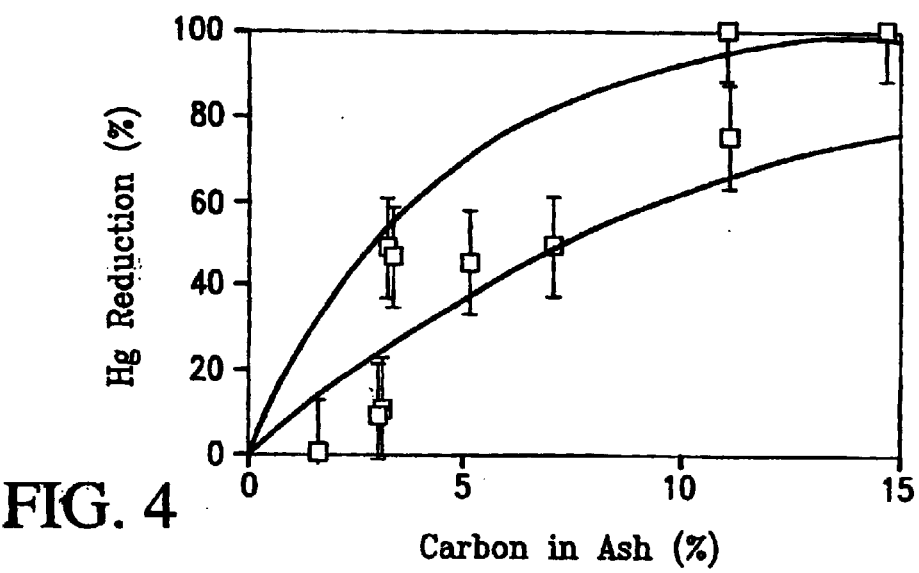

FIG. 4 shows a comparison of modeling predictions with BSF experimental data on mercury removal by carbon in ash of Kittanning coal. Vertical lines in FIG. 4 represent uncertainty of mercury concentration measurements in experiments, which was estimated to be ±15%. The space between the two curves in FIG. 4 represents modeling results obtained with two expressions of the rate coefficient for reaction (1) that fit to higher and lower efficiency of mercury absorption by fly ash. FIG. 4 demonstrates that modeling predictions agree with experimental data within uncertainty of experimental data. Modeling predicts that the efficiency of mercury removal increases as the amount of carbon in ash increases. Modeling predicts that about 90% mercury reduction can be achieved at approximately 10 to 15 weight percent carbon in ash under optimum conditions.

Thus modeling predicts that an increase in the amount of the reburning fuel will improve the efficiency of $NO_x$ reduction and will result in significant mercury removal. Modeling indicates that 90% mercury removal and 10% increase in $NO_x$ reduction can be achieved.

In known processes, fly ash collected in a PCD (ESP or baghouse) and subsequently re-injected shows little or no affinity for mercury absorption. It may be that the active carbon absorption sites of this fly ash are occupied by competing species such as $SO_2$, HCl, and even $H_2O$, thus reducing the available surface for mercury capture. Fly ash, once collected in a PCD, is likely to be "deactivated" for subsequent mercury absorption.

On the other hand in accordance with the invention, freshly formed or "in-situ" carbon in fly ash is quite active toward mercury absorption. Fly ash with a carbon content of 5%–15% has comparable mercury capture efficiency to injected activated carbon.

While preferred embodiments of the invention have been described, the present invention is capable of variation and modification and therefore should not be limited to the precise details of the EXAMPLES. The invention includes changes and alterations that fall within the purview of the following claims.

What is claimed is:

1. A method to decrease emission of mercury, comprising:
   selecting a factor to control a combustion process to generate a flue gas comprising fly ash with enhanced in situ-formed unburned carbon, wherein the factor is selected from the group consisting of reburning fuel, flue gas temperature, OFA injection, coal particle size, LNB flow, LNB design, combustion zone air, stoichiometric ratio of fuel, fuel/air mixing in a primary combustion zone and fuel/air mixing in a secondary combustion zone;
   controlling the combustion process according to the factor to produce the flue gas comprising fly ash with enhanced unburned carbon and to vaporize mercury;
   allowing the flue gas to cool to collect fly ash with enhanced unburned carbon with obsorbed mercury;
   passing the fly ash with enhanced unburned carbon with absorbed mercury through an ash burnout unit to remove carbon from the fly ash and to produce a mercury-containing exhaust gas; and
   passing the mercury-containing exhaust gas through a mercury capture reactor to capture the mercury.

2. The method of claim 1, comprising controlling the combustion process to produce a fly ash containing about 1 to about 30 weight percent carbon.

3. The method of claim 1, comprising controlling the combustion process to produce a fly ash containing 3 to 20 weight percent carbon.

4. The method of claim 1, controlling the combustion process to produce a fly ash containing 5 to 15 weight percent carbon.

5. The method of claim 1, comprising allowing the flue gas to cool to a temperature below 450° F.

6. The method of claim 1, comprising allowing the flue gas to cool to a temperature below 400° F.

7. The method of claim 1, comprising allowing the flue gas to cool to a temperature below 350° F.

8. The method of claim 1, further comprising removing $NO_x$ from the flue gas, wherein the process to remove $NO_x$ from the flue gas comprises forming fuel-lean and fuel-rich zones by a fuel staging process or an air staging process.

9. The method of claim 1, further comprising removing $NO_x$ from the flue gas.

10. The method of claim 1, further comprising removing $NO_x$ from the flue gas by a low $NO_x$ combustion technology.

11. The method of claim 1, further comprising removing $NO_x$ from the flue gas by a technology selected from low $NO_x$ burning, reburning, air staging, fuel-lean reburning and overfire air injection.

12. The method of claim 1, further comprising removing $NO_x$ from the flue gas by forming a fuel-lean zone and a fuel-rich zone by injection of solid fuel into a post combustion zone.

13. The method of claim 1, wherein the flue gas is generated from combustion of solid fuel.

14. The method of claim 1, wherein the flue gas is generated from combustion of a solid fuel selected from coal, biomass, waste product and combinations thereof.

15. The method of claim 1, comprising selecting a factor from the group consisting of amount of reburning fuel, flue gas temperature and OFA injection.

16. The method of claim 1, comprising selecting a factor from the group consisting of coal type and particle size.

17. The method of claim 1, comprising selecting a factor from the group consisting of LNB flow, LNB design, combustion zone air, stoichiometric ratio of fuel, fuel/air mixing in a primary combustion zone or fuel/air mixing in a secondary combustion zone.

18. The method of claim 1, conducted without activated carbon injection.

19. A method or operating a combustion furnace to decrease emission of mercury, comprising:
forming a fly ash with enhanced unburned carbon and forming vaporized mercury by (1) limiting an amount of air to the combustion furnace during combustion or by (2) fuel staging;
allowing the flue gas to cool to a lower temperature to collect fly ash comprising enhanced unburned carbon with absorbed mercury;
passing the fly ash with enhanced unburned carbon with absorbed mercury through an ash burnout unit to remove carbon from the fly ash and to produce a mercury-containing exhaust gas; and
passing the mercury-containing exhaust gas through a collection unit to capture the mercury.

20. The method of claim 19, comprising forming the fly ash with enhanced unburned carbon by fuel staging comprising firing the furnace in a main burner in the combustion zone and injecting additional fuel for reburning in a fuel rich subsequent combustion zone.

21. The method of claim 19, comprising forming the fly ash with enhanced unburned carbon by fuel staging comprising: firing the furnace in a main burner in the combustion zone; injecting additional fuel for reburning in a fuel rich subsequent combustion zone; and subsequently applying overfire air to burn out remaining combustibles.

22. The method of claim 19, comprising forming the fly ash with enhanced unburned carbon by fuel staging comprising: firing the furnace in a main burner in the combustion zone; injecting additional fuel for reburning in a fuel rich subsequent combustion zone; subsequently applying overfire air to burn out remaining combustibles; and collecting the fly ash by filtering an overfire stream at a reduced temperature.

23. The method of claim 19, comprising forming the fly ash with enhanced unburned carbon by fuel staging comprising firing the furnace in a main burner in the combustion zone; and injecting additional fuel for reburning in a fuel rich subsequent combustion zone; wherein the additional fuel injection is controlled to provide a reduced reburning temperature between 2000° F. to 2500° F.

24. The method of claim 19, comprising forming the fly ash with enhanced unburned carbon by fuel staging comprising firing the furnace in a main burner in the combustion zone; and injecting additional fuel for reburning in a fuel rich subsequent combustion zone; wherein the additional fuel injection is controlled to provide a reduced reburning temperature between 2000° F. to 2500° F. to provide an enhanced carbon in fly ash content between 8% and 14%.

25. The method of claim 19, comprising forming the fly ash with enhanced unburned carbon by fuel staging comprising firing the furnace in a main burner in the combustion zone; and injecting additional fuel for reburning in a fuel rich subsequent combustion zone; wherein the additional fuel injection is controlled to provide combustion at a reduced temperature in a range between 20% and 30% of the combustion zone temperature.

26. A method of increasing mercury removal from a combustion zone without the addition of activated carbon from an outside source, comprising increasing percentage of enhanced carbon in the combustion zone fly ash to capture an increased amount of mercury and recovering the mercury from the fly ash.

27. The method of claim 26, comprising increasing the percentage of enhanced carbon by combusting a feed fuel selected to provide said increased percentage.

28. The method of claim 26, comprising increasing the percentage of enhanced carbon by reburning in a fuel rich zone subsequent to an initial combustion zone; wherein additional fuel injection in the fuel rich zone is controlled to provide combustion at a reduced temperature from the temperature in the initial combustion zone.

29. The method of claim 26, comprising increasing the percentage of enhanced carbon by reducing amount of air to the combustion furnace during combustion to increase loss on ignition (LOI) (tom 5 to 15%.

30. The method of claim 26, comprising increasing the percentage of enhanced carbon by identifying a fuel that provides increased loss on ignition (LOI) end using the fuel for combustion in said combustion zone.

31. The method of claim 26, comprising increasing the percentage of enhanced carbon by selecting a fuel that provides increased loss on ignition (LOI) and using the fuel for combustion in said combustion zone.

32. The method of claim 26, comprising increasing mercury removal from the combustion was by at least greater then 0% to about 90% by increasing percentage of enhanced carbon in the combustion zone fly ash from at least greater than 0% up to about 15%.

* * * * *